(No Model.)

A. BALL.
DIRECT ACTING ENGINE.

No. 433,641. Patented Aug. 5, 1890.

WITNESSES
C. H. Berry
Frank L. Dyer

INVENTOR
Albert Ball
by Geo. W. Dyer
ATTORNEY.

UNITED STATES PATENT OFFICE.

ALBERT BALL, OF CLAREMONT, NEW HAMPSHIRE, ASSIGNOR TO THE SULLIVAN MACHINE COMPANY, OF SAME PLACE.

DIRECT-ACTING ENGINE.

SPECIFICATION forming part of Letters Patent No. 433,641, dated August 5, 1890.

Application filed April 2, 1889. Serial No. 305,739. (No model.)

*To all whom it may concern:*

Be it known that I, ALBERT BALL, a citizen of the United States, residing at Claremont, in the county of Sullivan and State of New Hampshire, have invented certain new and useful Improvements in Direct-Acting Steam-Engines; and I do hereby declare the following to be a full, clear, and exact description of the invention, which will enable others skilled in the art to which it appertains to make and use the same.

My invention relates to improvements in direct-acting engines to be driven by steam or other elastic fluid (all which will be included in this specification under the name of "steam") whose valves are moved by steam passing through ports which are opened and closed by the passing of the piston to and fro, and has for its object the obtaining a permanent fit or close contact between the port-openings and the surface of the piston or cylinder which is intended to close said ports.

My invention consists in having a packing at the port-opening, with a spring-backing so arranged that so fast as the packing becomes worn the packing will be pushed-forward and always in contact with the bearing-surface of the piston or cylinder, as the case may be.

In the accompanying drawings, like letters designate the same part.

Figure 1:
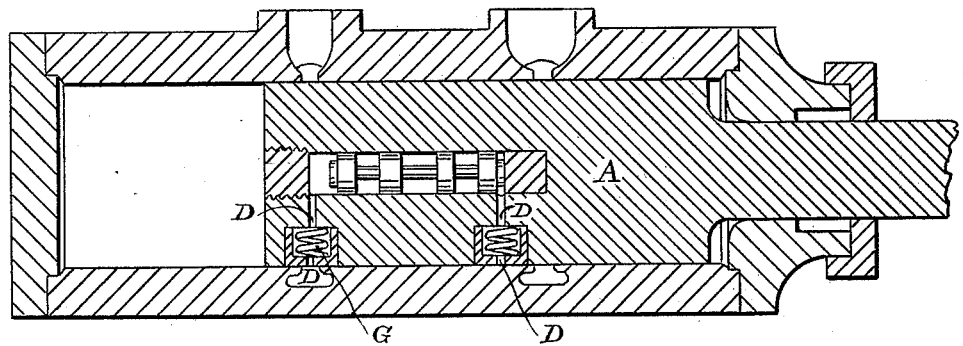
Figure 2:
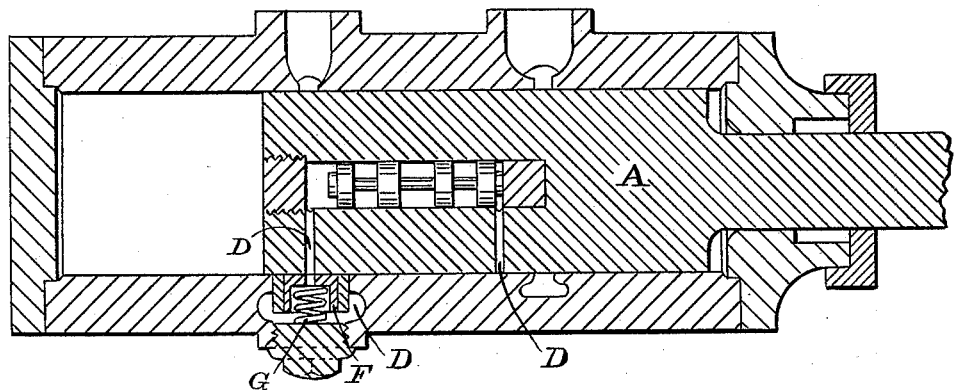
Figure 3:
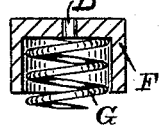

Figure 1 shows a longitudinal section of a cylinder and piston with valve, (so much as is necessary to show my invention,) showing the port-packing in the ports in the piston. Fig. 2 shows a similar longitudinal section, but showing a port-packing in a port in the cylinder. Fig. 3 shows the port-packing, enlarged, with a spring.

A is the piston.
C is the cylinder.

D D are reversing-ports in the piston and cylinder.

F F are the port-packings with springs G.

As fast as the packings become worn the springs (assisted by the steam) force them forward, and when in time they become too much worn they can be easily replaced by new packings.

My drawings show one form of steam-engine having the distributing-valve inside the piston; but my invention is equally applicable to other forms, and I do not mean to confine it to any special form of direct-acting engine.

I preferably use a spiral spring as most convenient to keep the packing to its work; but it is obvious other equivalent devices can be used, and I do not intend to limit myself to this particular form.

Having now described my invention, what I claim, and desire to secure by Letters Patent, is as follows:

1. In a direct-acting steam-engine, the combination of a cylinder, an elongated piston A, containing the valve and with ports therein and working in said cylinder, and a cup-shaped packing within the cylinder and having a steam-passage in its bearing-face and with a spring within its body, for the purpose herein mentioned.

2. An improved packing, consisting of a cup-shaped body having a bearing-face, a steam-passage extending through said bearing-face, and a coiled spring within the said body, substantially as set forth.

In testimony whereof I do affix my signature in presence of two witnesses.

ALBERT BALL.

Witnesses:
H. W. PARKER,
GEO. O. BALL.